United States Patent [19]

Drewett

[11] 3,937,170

[45] Feb. 10, 1976

[54] BUMPER GUARD AND ARRANGEMENT FOR WATER COVERED AREAS

[76] Inventor: Glen E. Drewett, P. O. Drawer 52627, Lafayette, La. 70501

[22] Filed: Oct. 29, 1974

[21] Appl. No.: 518,354

[52] U.S. Cl. ............... 114/219; 267/140; 293/71 R
[51] Int. Cl.² ................... B63B 69/02; F16F 7/12
[58] Field of Search ............... 114/219; 267/140; 293/71 R, 70; 52/718

[56] References Cited
UNITED STATES PATENTS

| | | | |
|---|---|---|---|
| 3,359,030 | 12/1967 | Newman | 114/219 X |
| 3,418,815 | 12/1968 | Kumazawa | 293/71 R X |
| 3,449,917 | 6/1969 | Roskopf | 114/219 |
| 3,473,836 | 10/1969 | Halter | 293/71 R X |
| 3,606,432 | 9/1971 | Honatzis | 293/71 R X |
| 3,822,909 | 7/1974 | Livingstone et al. | 293/71 R |

FOREIGN PATENTS OR APPLICATIONS

| | | | |
|---|---|---|---|
| 595,278 | 4/1934 | Germany | 293/71 R |

*Primary Examiner*—George E. A. Halvosa
*Assistant Examiner*—Sherman D. Basinger
*Attorney, Agent, or Firm*—Jack W. Hayden

[57] ABSTRACT

A support frame is positioned on a structure in a water covered area and receives and supports an elongated elastomer body to function as a bumper guard to protect the structure and vessel when contact is made. The support frame and the elongated elastomer body are constructed and arranged so that the elongated elastomer body may be positioned in the support from above water level, and may be withdrawn and replaced when necessary from above water level. The support frame includes inwardly extending plates to engage the elongated elastomer body to position it on the support frame and the elongated elastomer body is constructed and arranged to absorb shock, protect the support frame, and includes one or more rigid reinforcing members to inhibit unwanted or accidental removal of the elongated member from the support frames.

30 Claims, 7 Drawing Figures

BUMPER GUARD AND ARRANGEMENT FOR WATER COVERED AREAS

SUMMARY OF THE INVENTION

Various types of bumper guards have been proposed and are in use for structures in water covered areas, such as by way of example only, structures used in offshore drilling and production of oil and gas, as well as docks and other similar structures.

In the bumper guards presently in use so far as known to applicant, the construction of the bumper guards and their supports is such that they generally must be positioned on the structure in a manner which requires a diver to submerge below the water level for initial installation of the structure, or for replacement thereof as may become necessary.

An object of the present invention is to provide a support frame and an elongated elastomer body thereon which is positioned and supported on a structure for functioning as a bumper guard in watered covered areas without necessitating or requiring submerging by a diver or anyone during the installation or replacement of the elastomer body forming part of the invention.

Another object of the present invention is to provide an elongated elastomer body of a desired configuration so that it may be quickly and easily positioned on a support frame from above water level and retained therein, but which can be removed from above water level with a minimum of effort.

Another object of the present invention is to provide an elongated elastomer body of a desired configuration so that it may be quickly and easily positioned on a support frame from above water level and retained therein, but which can be removed from above water level with a minimum of effort, and reinforcing means in the elastomer body to inhibit unwanted or accidental removal of the elastomer body from the support frame.

Another object of the present invention is to provide an elongated elastomer body of a desired configuration so that it may be quickly and easily positioned on a support frame from above water level and retained therein, but which can be removed from above water level with a minimum of effort, and reinforcing means in the elastomer body to inhibit unwanted or accidental removal of the elastomer body from the support frame, and wherein the elastomer body includes an opening extending longitudinally thereof to function as an energy absorbing arrangement when contacted by a vessel.

Another object of the present invention is to provide an elongated elastomer body of a desired configuration so that it may be quickly and easily positioned on a support frame from above water level and retained therein, but which can be removed from above water level with a minimum of effort, and reinforcing means in the elastomer body to inhibit unwanted or accidental removal of the elastomer body from the support frame, and wherein the elastomer body includes an opening extending longitudinally thereof to function as an energy absorbing arrangement when contacted by a vessel, and including means on the support frame to position the elongated elastomer body against undesired lateral or longitudinal movement.

Another object of the present invention is to provide an elongated elastomer body of a desired configuration so that it may be quickly and easily positioned on a support frame from above water level and retained therein, but which can be removed from above water level with a minimum of effort, with the configuration of the elongated elastomer body being such that it absorbs shock, protects the support frame and includes reinforcing means to inhibit unwanted or accidental removal of the elongated body from the support frame.

Other objects and advantages of the invention will become apparent from a consideration of the following description and drawings.

DESCRIPTION OF THE PREFERRED EMBODIMENTS

Figure 5:
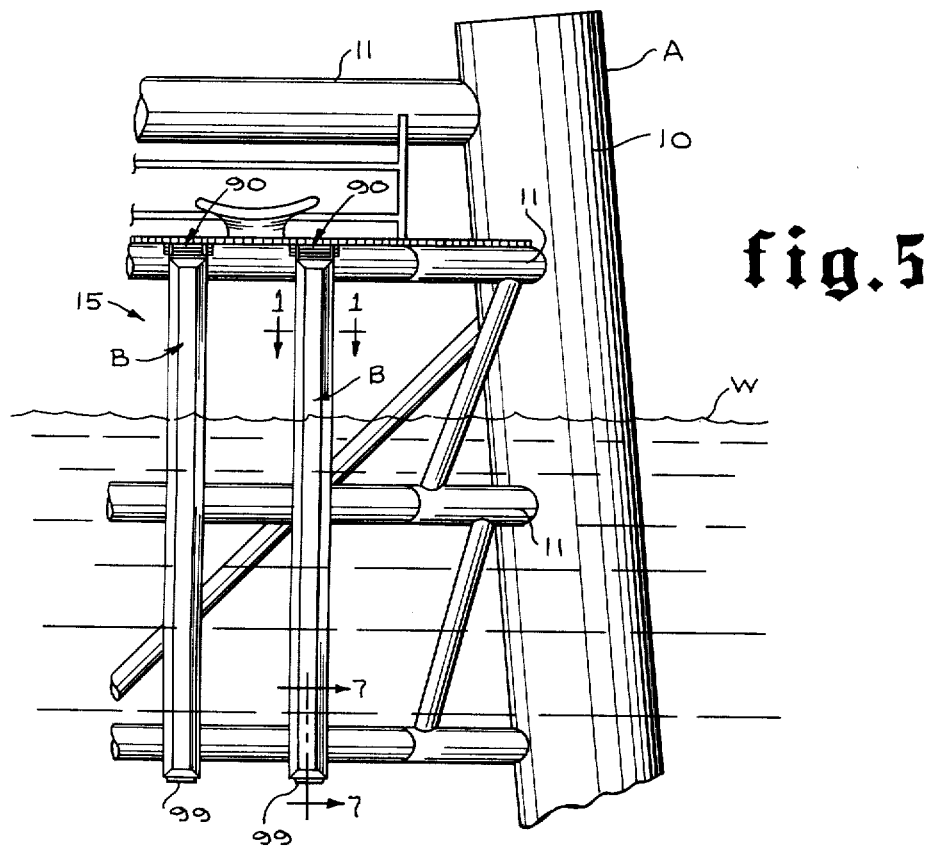
FIG. 5 illustrates an arrangement of an offshore structure in a water covered area with the present invention positioned thereon.
Figure 6:
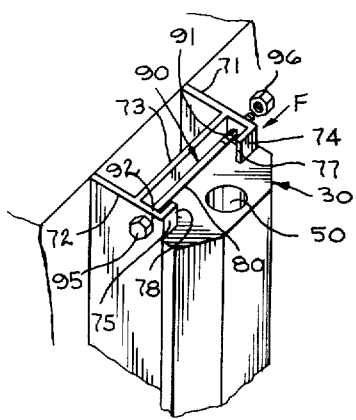
FIG. 6 is a partial isometric view of the upper end of the support frame showing means for removably retaining the elongated elastomer body in position thereon.

Attention is first directed to FIG. 5 of the drawings wherein an offshore structure, dock or the like is represented by the letter A. It includes any suitably upwardly extending members 10 having lateral bracing 11 extending between other upwardly extending members 10 (not shown), and the present invention referred to generally at 15 may be positioned to the laterally extending members 11 in an upwardly extending manner as illustrated.

It will be noted that the water level represented by the letter W, is such that it is between the upper and lower end of the invention 15 as shown.

Also as shown in FIG. 5, any suitable number of the support frames and elongated elastomer bodies comprising the invention 15 may be employed and are arranged at suitably spaced intervals on the laterally extending members 11 as shown in FIG. 5 of the drawings.

In FIG. 1, the invention again is generally illustrated by the numeral 15 and is shown as including a support frame referred to by the letter F, and an elongated elastomer body referred to by the letter B. The elongated elastomer body B includes a base member referred to generally at 20 and includes a bottom surface 21, sides surfaces 22 and 23 extending from the body surface in the same direction with a pair of top surfaces 24 and 25 which extend inwardly toward each other in the same general plane as illustrated in FIG. 1 of the drawings but terminate at their ends 26 and 27 in spaced relation, so that the combined length of the top surfaces 24 and 25 is less than the length of the bottom surface 21.

The upper member 30 of the elongated elastomer body B includes upwardly extending surfaces 31 and 32 which extend upwardly from the ends 26 and 27 of the surfaces 24 and 25 of the base member 20 and terminate at their upper end 38, 39 respectively where they join with surfaces 34, 35 which extend in a plane above the plane in which said top surfaces 24 and 25 of the base member 20 extend.

Figure 1:
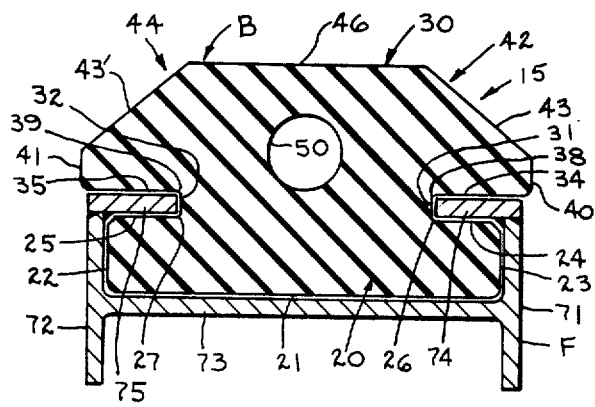
FIG. 1 is a sectional view on the line 1—1 of FIG. 5 and illustrates a form of the elongated elastomer body of the present invention and the support frame on which it is positioned.

The surfaces 34 and 35 extend outwardly from the upper ends 38 and 39 of each of the upwardly extending surfaces 31 and 32 as shown in FIG. 1 of the drawings. Since the surfaces 24 and 34 and 25 and 35 are spaced, the foregoing configuration provides longitudinally extending grooves formed in the elastomer body B on each side thereof for engagement with the support frame F in a manner as will be described in greater detail hereinafter.

The upper member 30 of the elongated body B also includes side surfaces referred to generally at 42 and 44 which terminate at the top surface 46 on the upper member 30.

In the preferred form, an opening 50 is formed in the elongated elastomer body B which extends longitudinally thereof as illustrated in the drawings.

In the preferred form such as illustrated in the drawings, the surfaces 34 and 35 will be of a greater extent than the surface 24 and the surface 25 which they overlie as shown in the drawings. Thus the upper member 30 overlies the frame F in a manner to inhibit contact of the frame F with a vessel and thus protects the frame F against damage.

Figure 2:
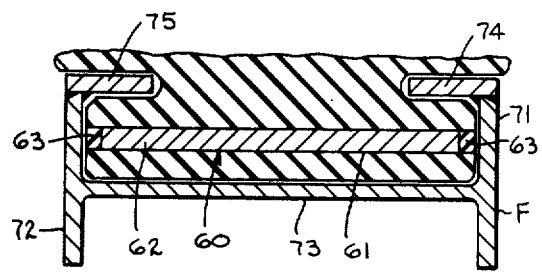
FIG. 2 is a fragmentary sectional view somewhat similar to FIG. 1, and illustrating a form of reinforcing means in the elongated elastomer body to inhibit unwanted or accidental removal of the elastomer body from the support frame.
Figure 7:
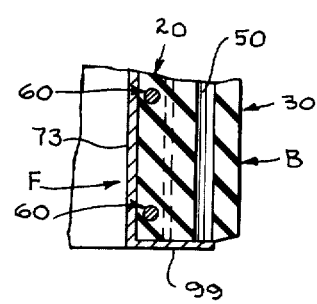
FIG. 7 is a sectional view on the line 7—7 of FIG. 5 and shows one form of means for supporting an elongated elastomer body at the lower end of the support means.

In some instances it will be desirable to provide the elastomer body B with reinforcing which may assume the form as referred to generally at 60 in FIG. 2. As shown in FIG. 7, the reinforcing 60 may be provided at longitudinally spaced intervals, when such reinforcing assumes the specific configuration illustrated in the drawings; however, it can be appreciated that any other suitable reinforcing arrangement may be employed to accomplish the desired results of the invention.

Such reinforcing arrangement includes openings 61 which extend laterally in the base member 20 and extend between the sides 23 and 24 as shown. Thereafter a suitable pin or plate member 62 may be positioned in the opening 61, and if desired an elastomer plug as illustrated at 63 may be employed to fill and seal off the end of the recess 61 to inhibit corrosion of the member 62.

As will be apparent from the foregoing and from the drawing, the reinforcing means includes at least one member which is rigid along the entire extent thereof, which member is exemplified by pin or plate 62. As also apparent from the drawing, the rigid member is disposed between the bottom surface of the base member and the longitudinally extending grooves.

In some instances, the reinforcing may be molded in the body when it is formed, thus eliminating the closure plugs 63.

The upwardly and inwardly side surfaces 42, 44 are shown as being formed by the surfaces 40 and 42 which extend upwardly from the outer edge of the surfaces 34 and 35 respectively, and the surfaces 40, 41 are joined at their upper ends by the upwardly and inwardly sloping surfaces 43 and 43' as illustrated.

Figure 3:
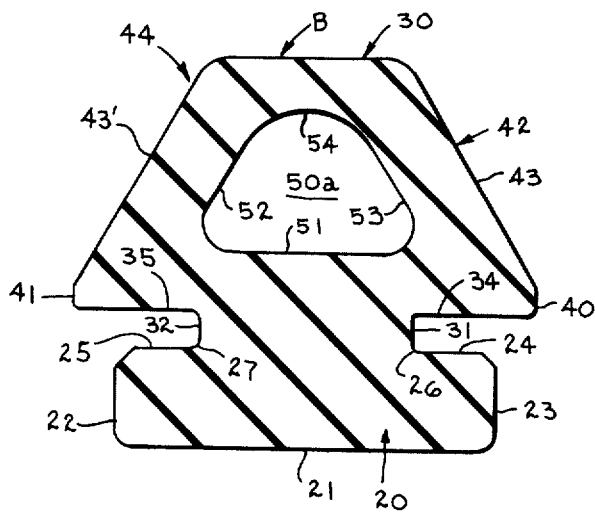
FIG. 3 is a sectional view illustrating an alternate form of an elastomer body of the present invention.
Figure 4:
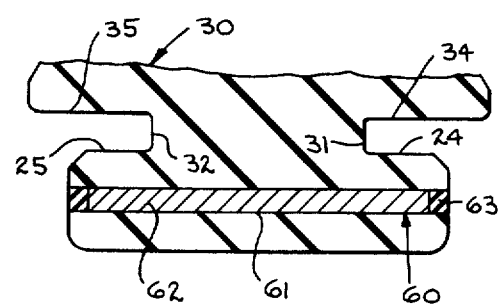
FIG. 4 is a fragmentary sectional view similar to FIG. 2 and showing a form of reinforcing means employed with the elongated elastomer body of FIG. 3.

In FIGS. 3 and 4 an alternate embodiment of the elongated elastomer body B is illustrated wherein like numerals refer to like parts. The body B includes a base member 20 and an upper member 30. The base member 20 includes the bottom surface 21, surfaces 22, 23, 24, 25 as previously described and the upper member 30 includes the surfaces 34 and 35 which extend outwardly from the upwardly extending surface 31 and 32 at each end of the surfaces 24 and 25.

Side surfaces 42 and 44 are again provided; however, it will be noted that in this configuration the extent of the upwardly and inwardly sloping surfaces 43 and 43' are of substantial extent in relation to the surfaces 40 and 41 which extend upwardly from the surfaces 34 and 35 respectively.

Also, the opening 50a is of a somewhat different configuration and as illustrated generally conforms to the configuration of the upper member 30 and includes a lower surface 51, generally parallel to surfaces 34, 35, joined with the upwardly and inwardly sloping surfaces 52 and 53 generally parallel to surfaces 43, 43' as shown and which merge into the generally arcuate upper surface 54 as shown.

In addition, the ratio of the volume between the base member 20 and upper member 30 of the FIG. 1 form of the elongated elastomer body B is different from that shown in FIG. 3. The ratio of the volume of the base member 20 to the upper member 30 of the FIG. 1 form is generally in the approximate range to 1 to 2 whereas the ratio of the volume of the base member 20 to the upper member 30 of the FIG. 3 form is in the range of 1 to 3 as shown. Also, it will be noted that the surface arrangement 34, 24 and 25, 35 forms a longitudinal groove extending along each edge of the elongated elastomer body B of the FIG. 3 form as in the FIG. 1 form.

The support frame F includes a pair of longitudinally extending generally parallel sides 71 and 72 as shown in the drawings which are positioned in spaced relation and maintained in spaced relation by the first plate 73. The first plate 73 extends longitudinally between plates 71 and 72 and is secured thereto.

At one end of the plates 71, 72, a pair of plates 74 and 75 extend inwardly towards each other in generally the same plane and from the sides 71 and 72 to which they are respectively secured as shown in the drawings and are positioned in spaced relation to the first plate 73.

The inner ends 77 and 78 of the plates 74 and 75 terminate in spaced relation to form a space 80 therebetween.

Means referred to generally at 90 may be in any suitable form to removably retain the elastomer body B in position on the support frame F and is shown as being in the form of openings 91 and 92 at the upper end in the longitudinally extending sides 71 and 72 which receive the bolt 95 therein to which the nut 96 may be threadedly received.

A footing or bottom support is provided for the elongated elastomer body B, and is shown as extending from the plate 73 towards the pair of plates 74 and 75 therebeyond if desired as illustrated at 99.

If desired, the support frame F and the body B may be engaged prior to positioning on the structure; however, it is preferable that the support frame 11 be positioned on the lateral support 11 prior to the time that the structure A is positioned in the water covered area. The support frame F may be secured to the structure A in any suitable manner such as by welding or the like.

In order to position the elongated body B in the support frame F, it is positioned vertically above the frame F so that the grooves formed along each edge of the body B are aligned with the plates 74 and 75 and the body then moved or lowered downwardly along the support frame F until it rests on the footing 99.

Thereafter the removable securing means 90 may be positioned to retain it in place.

When it is desired to replace the elongated body B, the removable means 90 may be removed from the support frame F and the body B engaged and pulled upwardly out of the support frame F. All of the foregoing is accomplished above the water level W thereby avoiding the necessity of a diver going beneath the water to position the bumper guard, as may be required with prior art configurations.

The reinforcing 60 is of greater longitudinal extent than the gap or space 80 between the ends of plates 74, 75 so that it overlaps the plates 74, 75 as shown and thus prevents the elastomer body B from being pulled or removed from the support frame F should it receive a severe impact.

In addition, it will be noted that the support frame configuration and arrangement in cooperation with the configuration of the elongated elastomer body B inhibits undesired lateral or longitudinal movement of the elastomer body B, but the enlarged upper member 30 and the opening 50, along with base member 20 of the elastomer body B absorbs impact or shock by reason of vessel contact therewith.

While the elastomer body B has been shown as being of a single continuous length, it can be appreciated that a plurality of shorter lengths may be employed and positioned in the support frame F and could still be engaged from above water level by a grapple of any suitable configuration.

The foregoing disclosure and description of the invention are illustrative and explanatory thereof, and various changes in the size, shape, and materials as well as in the details of the illustrated construction may be made without departing from the spirit of the invention.

I claim:

1. An elongated elastomer body for use as a bumper guard in water covered areas and for attachment to a partially submerged structure from above the surface of the water, the body comprising:
   a. a base member including:
      1. a bottom surface;
      2. a pair of side surfaces;
      3. a pair of top surfaces extending inwardly toward each other in the same general plane, but terminating at their ends in spaced relation with the combined length of said pair of top surfaces being less than the length of said bottom surface;
   b. an upper member including:
      1. an upwardly extending surface at the end of each pair of top surfaces of said base member, and terminating at their upper ends in a plane above the plane in which said top surfaces of said base member extend;
      2. a surface extending outwardly from the upper ends of each of said upwardly extending surfaces and extending in the same general plane in spaced relation to and overlying said top surfaces of said base member to thereby form a pair of longitudinally extending grooves along each edge of said elongated elastomer body;
   c. reinforcing means in said base member, said reinforcing means including a member which is rigid along the entire extent thereof, said rigid member being disposed between said bottom surface of said base member and said longitudinally extending grooves, the dimension of said rigid member in a direction transverse to said longitudinally extending grooves being greater than the space between said ends of said top surfaces of said base member so that said rigid member overlaps the space between the grooves and extends outwardly of both upwardly extending surfaces defining said grooves.

2. The invention of claim 1 wherein the elastomer body includes an opening extending longitudinally thereof.

3. The invention of claim 2 wherein the opening is in said upper member.

4. The invention of claim 2 wherein the longitudinally extending opening in the elongated elastomer body is generally circular in cross section.

5. The invention of claim 2 wherein the longitudinally extending opening in cross section assumes the general configuration of said upper member.

6. The invention of claim 1 including a pair of side surfaces on said upper member extending upwardly from each of said grooves, said side surfaces on said upper member each including a pair of surfaces comprising:
   a. first surfaces extending substantially at right angles and upwardly from each of the grooves in the elastomer body and terminating in spaced relation above the grooves;
   b. second surfaces sloping upwardly and inwardly to a top surface on said upper member and from the termination of said first surfaces.

7. The invention of claim 6 wherein the bottom surface on said base member and the top surface on said upper member extend generally parallel to each other.

8. The invention of claim 6 wherein the bottom surface on said base member and the top surface on said upper member extend generally parallel to each other, and wherein the bottom surface is of greater length than the top surface.

9. The invention of claim 1 wherein each of said outwardly extending surfaces on said upper member extend beyond said pair of side surfaces on said base member whereby the upper member of the elongated elastomer body overhangs said base member of the elongated elastomer body.

10. The invention of claim 1 wherein said reinforcing means includes:
    a. openings at spaced longitudinal intervals along said elongated elastomer body between said bottom surface and the grooves extending longitudinally along the edges of the elongated elastomer body; and
    b. one said rigid member in each of said spaced openings.

11. The invention of claim 10 wherein closure means are provided in said spaced openings at each end of said rigid members.

12. The invention of claim 1 wherein the ratio of volume of the base member to the upper member is in the range of approximately one to three.

13. The invention of claim 1 wherein the ratio of volume of the base member to the upper member is in the range of approximately one to two.

14. A bumper guard arrangement for a structure in a water covered area comprising:
 a. a support frame including:
  1. a pair of longitudinally extending sides positioned in spaced relation;
  2. a first plate extending longitudinally between and secured to said sides between their ends;
  3. a pair of plates secured to and extending inwardly toward each other from one end of said sides and positioned in spaced relation to said first plate, said pair of plates terminating at innermost edges in spaced relation to form a space therebetween;
 b. an elongated elastomer body positioned on said support frame including:
  1. a base member positioned adjacent said first plate;
  2. an upper member projecting beyond said pair of plates, and
  3. there being a longitudinally extending groove on each side of said elongated elastomer body in which said pair of plates are engaged for positioning said elongated elastomer body on said support frame;
 c. reinforcing means in said base member, said reinforcing means including a member which is rigid along the entire extent thereof, the dimension of said rigid member in a direction transverse to said longitudinally extending grooves being greater than said space between said inwardly extending plates of said support frame, said rigid member overlapping said space and extending outwardly of said innermost edges on said inwardly extending plates, whereby said reinforcing means facilitates insertion and removal of said elastomer body into and from said support frame by longitudinal sliding from above the surface of the water while also positively restraining relative movement thereof in any other direction to thereby firmly secure the elastomer body with respect to the support frame during use.

15. The invention of claim 14 including surface means extending from said first plate toward said pair of plates to support said elongated elastomer body at a position below the water covered area.

16. The invention of claim 15 including removable means extending between said first plate and said pair of plates to retain said elongated body in position on said support frame and removable to enable said elongated elastomer body to be replaced or positioned on said support frame from above water level.

17. The invention of claim 14 wherein said elongated elastomer body includes an opening extending longitudinally of said body.

18. The invention of claim 17 wherein the opening is in said upper member.

19. The invention of claim 17 wherein said elongated elastomer body includes:
 a. a base member formed by five longitudinally extending surfaces, said surfaces including:
  1. a bottom surface;
  2. a pair of side surfaces;
  3. a pair of top surfaces extending inwardly toward each other in the same general plane, but terminating at their ends in spaced relation with the combined length of said pair of top surfaces being less than the length of said bottom surface;
 b. an upper member including:
  1. an upwardly extending surface at the end of each of the pair of top surfaces of said base member, and terminating at their upper ends in a plane above the plane in which said top surfaces of said base member extend;
  2. a surface extending outwardly from the upper ends of each of said upwardly extending surfaces and extending in the same general plane in spaced relation to and overlying said top surfaces of said base member to thereby form a pair of longitudinally extending grooves along each edge of said elongated elastomer body;
 c. side surfaces on said upper member extending upwardly from each of the grooves; and
 d. a top surface on said upper member forming the termination of said side surfaces on said upper member.

20. The invention of claim 19 wherein said side surfaces on said upper member each includes a pair of surfaces comprising:
 a. first surfaces extending substantially at right angles and upwardly from each of the grooves along the edges of the elastomer body and terminating in spaced relation above the grooves;
 b. second surfaces sloping upwardly and inwardly to the top surface and from the termination of said first surfaces.

21. The invention of claim 19 wherein the bottom surface on said base member and the top surface on said upper member extend generally parallel to each other.

22. The invention of claim 19 wherein the ratio of volume of the base member to the upper member is in the range of approximately one to two.

23. The invention of claim 19 wherein each of said outwardly extending surfaces on said upper member extend beyond said pair of side surfaces on said base member whereby the upper member of the elongated elastomer body overhangs said base member of the elongated elastomer body and said pair of plates on said support frame.

24. The invention of claim 19 wherein the ratio of volume of the base member to the upper member is in the range of approximately one to three.

25. The invention of claim 19 wherein the bottom surface on said base member and the top surface on said upper member extend generally parallel to each other, and wherein the bottom surface is of greater length than the top surface.

26. The invention of claim 19 wherein the longitudinally extending opening in the elongated elastomer body is generally circular in cross section.

27. The invention of claim 19 wherein the longitudinally extending opening in cross section assumes the general configuration of said upper member.

28. The invention of claim 19 including means adjacent each end of the support frame to enable an elongated elastomer body to be positioned on the frame and secured in position from above water level.

29. The invention of claim 14 wherein said reinforcing means includes:
 a. openings at spaced longitudinal intervals along said elongated elastomer body between said bottom surface and the grooves extending longitudinally of the elongated elastomer body; and b. on said rigid member in each of said spaced openings.

30. The invention of claim 29 wherein closure means are provided in said spaced openings at each end of said rigid members.

* * * * *

UNITED STATES PATENT OFFICE
CERTIFICATE OF CORRECTION

Patent No. 3,937,170          Dated February 10, 1976

Inventor(s) Glen E. Drewett

It is certified that error appears in the above-identified patent and that said Letters Patent are hereby corrected as shown below:

Col. 7, line 24, "there being" should be --therebeing--.

Col. 7, line 51, after "elongated" insert --elastomer--.

Col. 9, line 1, "on" should be --one--.

Signed and Sealed this twenty-seventh Day of April 1976

[SEAL]

Attest:

RUTH C. MASON
Attesting Officer

C. MARSHALL DANN
Commissioner of Patents and Trademarks